(12) United States Patent
Mubaslat et al.

(10) Patent No.: US 7,675,248 B2
(45) Date of Patent: Mar. 9, 2010

(54) DUAL MODE SEARCHLIGHT DIMMING CONTROLLER SYSTEMS AND METHODS

(75) Inventors: Saed M. Mubaslat, Miamisburg, OH (US); Craig E. Giffen, Hilliard, OH (US); Richard P. Policy, Urbana, OH (US); Joseph L. Ferguson, Cable, OH (US)

(73) Assignee: Honeywell International Inc., Morristown, NJ (US)

( * ) Notice: Subject to any disclaimer, the term of this patent is extended or adjusted under 35 U.S.C. 154(b) by 119 days.

(21) Appl. No.: 11/758,499

(22) Filed: Jun. 5, 2007

(65) Prior Publication Data

US 2008/0297065 A1 Dec. 4, 2008

Related U.S. Application Data

(60) Provisional application No. 60/941,583, filed on Jun. 1, 2007.

(51) Int. Cl.
*G05F 1/00* (2006.01)
(52) U.S. Cl. ........................ 315/308; 315/291; 315/312; 315/247; 315/159
(58) Field of Classification Search ......... 315/312–326, 315/209 R, 224, 291, 307–311, 149–159
See application file for complete search history.

(56) References Cited

U.S. PATENT DOCUMENTS

| | | | |
|---|---|---|---|
| 7,391,297 B2 * | 6/2008 | Cash et al. ................... 340/3.5 |
| 2005/0179404 A1 * | 8/2005 | Veskovic et al. ............ 315/291 |
| 2005/0243549 A1 * | 11/2005 | Ruston ....................... 362/233 |
| 2006/0028811 A1 * | 2/2006 | Ross et al. .................. 362/157 |
| 2006/0125426 A1 * | 6/2006 | Veskovic et al. ............ 315/312 |
| 2006/0208666 A1 * | 9/2006 | Johnson ...................... 315/294 |
| 2007/0045524 A1 * | 3/2007 | Rains et al. ................. 250/228 |
| 2007/0132405 A1 * | 6/2007 | Hillis et al. ................. 315/292 |

\* cited by examiner

*Primary Examiner*—Tuyet Vo
(74) *Attorney, Agent, or Firm*—Black Lowe & Graham PLLC

(57) ABSTRACT

A solid state microprocessor or digital signal processor (DSP) for dual mode illumination and dimming into modern aerospace searchlights. The system is a universal dimming platform with "smart functions" that include and are not limited to multiple light intensity linearization curves, analog and/or digital input dimming interface, built-in tests and health monitoring, synchronized dual mode light output with canopy position, light driver redundancy, lamp life reporting, and controlled switching with improved EMI. With real-time monitoring of the system parameters it monitors the lights proper operation and failures which can be a concern for flight-critical lighting.

13 Claims, 3 Drawing Sheets

DUAL MODE SEARCHLIGHT DIMMING CONTROLLER SYSTEMS AND METHODS

PRIORITY CLAIM

This application claims priority to provisional patent application Ser. No. 60/941,583 filed on Jun. 1, 2007 and is incorporated herein by reference.

GOVERNMENT RIGHTS

The U.S. Government may have rights to this invention under U.S. Army contract number DAAH23-03-D-0204.

BACKGROUND OF THE INVENTION

Aerospace searchlights that are based on mechanical switches or relays have limited or no built-in capabilities for visible (VIS) or infrared (IR) light dimming. In such searchlights the added dimming functionality in most cases will require two external dimmers; one for the VIS and the other for the IR. Because light dimming requires added electronic components within a limited space, and because of the added challenges in thermal management and electromagnetic interference (EMI), recent solid state based dual mode searchlights controllers are limited to motor actuation control and light source enabling or disabling without dimming. Older searchlight technologies do not support programmable dual mode universal light controls, interface to the canopy position, or integration to aircraft management systems.

SUMMARY OF THE INVENTION

The present invention provides a solid state microprocessor or digital signal processor (DSP) (a system controller) for dual mode illumination and dimming into modern aerospace searchlights. The present invention provides a universal dimming platform with "smart functions" that include and are not limited to multiple light intensity linearization curves, analog and/or digital input dimming interfaces, built-in tests and health monitoring, synchronized dual mode light output with canopy position, light driver redundancy, lamp life reporting, and controlled switching with improved EMI. With real-time monitoring of the searchlight parameters, the system controller monitors the lights proper operation and failures which can be a concern for flight-critical lighting.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

Figure 1:
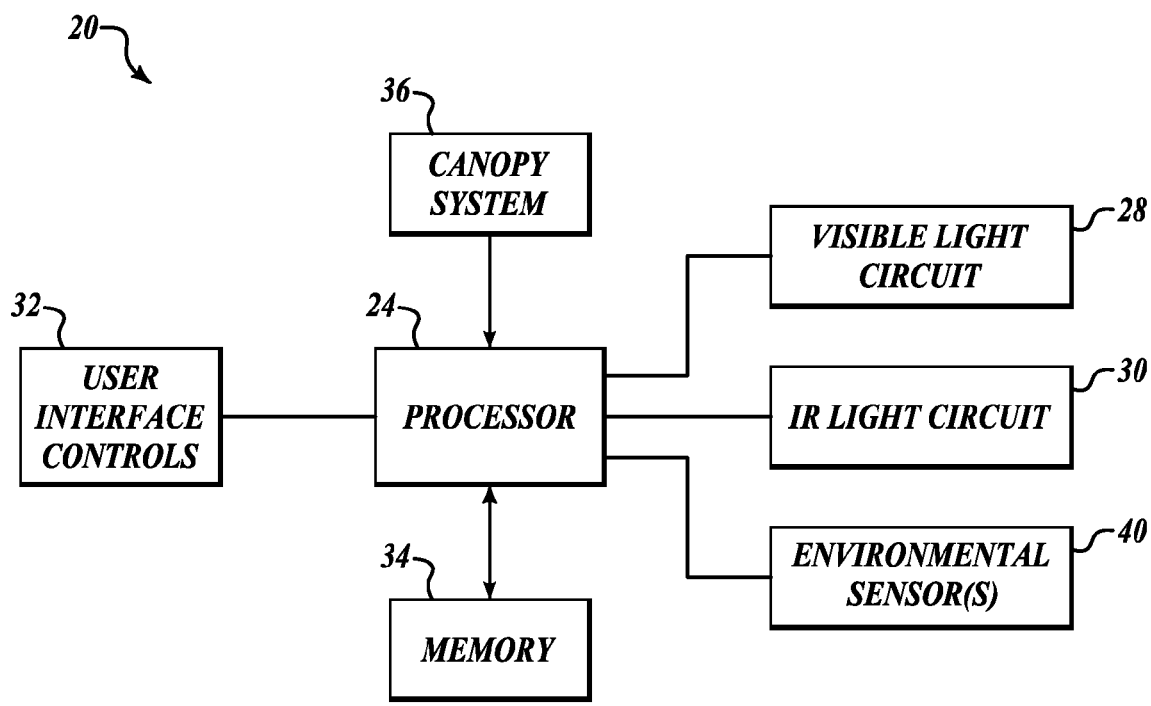
FIGS. 1-3 are schematic diagrams of an example system formed in accordance with an embodiment of the present invention.

As shown in FIG. 1, a microprocessor or digital signal processor (DSP)-based dimming control system 20 provides a universal programmable platform that can be modified to meet the needs of various lighting systems requiring variable light intensity. In one embodiment, the system 20 provides two modes of illumination. The first mode is visible light illumination, based on halogen or incandescent lighting, and the second mode of illumination is infrared (IR) illumination, based on solid state light-emitting diodes (LED). The system 20 provides dimming control during the two modes of illumination. The system 20 performs self adjustment in order to provide linear dimming from 0-100% intensity.

In one embodiment, the system 20 includes a controller 24, a visible light circuit 28, an IR light circuit 30, memory 34, a canopy system 36, user interface controls 32, and one or more environmental sensors 40. The controller 24 receives information from the user interface controls 32, the canopy system 36, stored data from memory 34 and environment sensor data in order to determine how to control operation of the circuits 28, 30. The controller 24 may be an off-the-shelf microprocessor or DSP that is programmed to operate as described below.

The circuits 28, 30 include visible and IR lights that are part of a searchlight included on a rotating hub that is housed in a canopy. The canopy system 36 provides enable and disable signals based on canopy feedback sensor(s) (not shown) to the controller 24. When the feedback sensor(s) determines when the searchlight is clear of a aircraft mounting platform (not shown), an enable signal is produced. The controller 24 controls operation of the circuits 28, 30 based on the received enable and disable signals. In one embodiment, the controller 24 and canopy system 36 communicate using a serial communication interface or other comparable communication signaling method.

In one embodiment, the controller 24 operates in a relatively high-voltage state thereby reducing the noise-to-signal ratio as much as possible. For example, signals outputted by the controller 24 are level shifted from 3.3 VDC to 5.0 VDC (see level shifts in the following figures). Similarly, input signals to the controller 24 are shifted down from 5.0 VDC to 3.3 VDC. Also, communication with the nonvolatile memory 34 is performed using a serial or other type of digital interface. The controller frequency is set by a built-in phase locked loop (PLL) and the base frequency is set by an external crystal oscillator.

The memory 34 may include electrically erasable, programmable, read-only memory (EEPROM) or flash memory that is in communication with the controller 24. The controller 24 may include various other types of wired or wireless communication means, such as a joint test action group (JTAG) interface or RS-232 that allow connection of an external diagnostic system (not shown), such as a hand-held computer system.

In one embodiment, the environmental sensors 40 include a temperature sensor (not shown) that is mounted within or near the circuit 28, 30. The temperature sensor outputs a temperature signal to the controller 24. The controller 24 analyzes the received temperature signal to determine if the sensed temperature is above a predefined threshold temperature limit. If the sensed temperature is above the threshold temperature limit, then the controller 24 records a fault into the memory 34 and may deactivate the respective circuit 28, 30.

Figure 2:
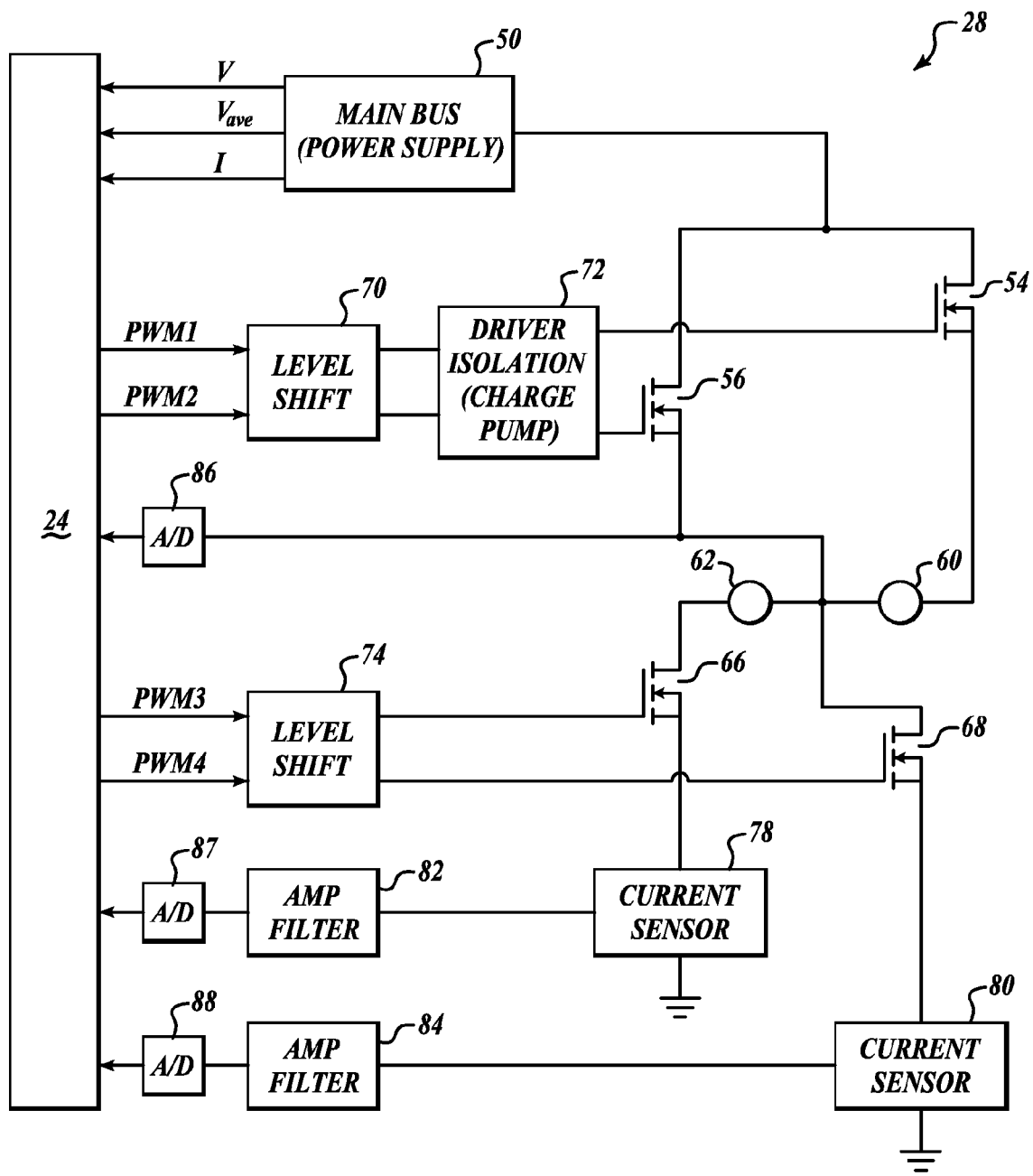

FIG. 2 illustrates a more detailed example of the visible light circuit 28. The circuit 28 includes level shifts 70, 74, a driver isolation (charge pump) component 72, four switches 54, 56, 66, 68, two halogen or incandescent lights 60, 62, two current sensors 78, 80, and two amplifier filters 82, 84. The level shifts 70, 74 are configured to receive two pulse-width modulation (PWM) independent control signals from the controller 24. In one embodiment, the switches 54, 56, 66, 68 are N-channel MOSFETs. The drains of switches 54, 56 are connected to a main bus power supply 50. The main bus power supply 50 supplies a source voltage, an average voltage value and a current value to the controller 24 for analysis. The source of the switch 54 is connected to a first lead of the light 60. The source of the switch 56 is connected to a second lead of the light 60 and a first lead of the light 62. The gate of the switch 54 is connected to the driver isolation component 72 in order to receive an adjusted PWM1 signal from the controller 24. The gate of the switch 56 is connected to the driver isolation component 72 in order to receive an adjusted PWM2 signal. PWM1 and PWM2 are increased in voltage by the level shift 70 and are controlled by the driver isolation component 72 in order to maintain the switches 54, 56 within an operating zone, because their sources are not connected to ground. The second level shift 74 receives a PWM3 signal and PWM4 signal from the controller 24. The PWM3 signal is increased in voltage by the level shift 74 and sent to the gate of the switch 66. The drain of the switch 66 is connected to a second lead of the light 62. The source of the switch 66 is connected to ground through the first current sensor 78. The PWM4 signal is increased in voltage by the level shift 74 and sent to the gate of the switch 68. The drain of the switch 68 is connected to the second lead of the light 60 and the first lead of the light 62. The source of the switch 68 is connected to ground through the second current sensor 80. The current sensors 78, 80 are connected to respective amplification filters 82, 84, which block high frequency noises and increase the resolution with a higher signal-to-noise ratio. The output of the amplification filters 82, 84 are sent to the controller 24 via analog to digital (A/D) converters 87, 88.

The PWM1-4 signals (channels) are independent with adjustable frequency in phase in order to reduce electromagnetic interference (EMI). The PWM1-4 signals control the voltage modulation across the switches 54, 56, 66, 68 and thus the power across the two lights 60, 62. After the enable signal is received from the canopy system 36 and a visible lamp ON/OFF switch has been activated in the ON position (and possibly a master light ON signal), the PWM1 and PWM3 signals activate their switches 54, 66, while the PWM2 and PWM4 signals do not. This causes power supplied by the main bus power supply 50 to pass through the switch 54 through the lights 60, 62 and then to ground through the switch 66 and current sensor 78. The controller 24 performs dimming after a dimming signal has been received from the user interface controls 32. Dimming of the halogen or incandescent lights 60, 62 is performed by changing the duty cycle of PWM1 and PWM3 signals. The controller 24 determines the duty cycle according to information stored in the memory 34. The stored information includes a brightness linearization curve and a PWM duty cycle for a desired light output.

During a running condition and after a specific halogen or incandescent start-up delay, the average halogen or incandescent current is monitored by the controller 24 to determine whether the lamp current outputted by the analog to digital (A/D) converter 87 is above the normal operating level. If the current exceeds the normal level, the halogen or incandescent lights 60, 62 may be deactivated for a specific predefined period of time followed by a restart attempt provided that the halogen or incandescent command is still being issued. The controller 24 identifies this condition as a fault and records the fault in the memory 34. If the controller 24 determines that this improper lamp current still exists, the lights 60, 62 may be shut down. In one embodiment, the functionality provided by the A/D converter 86 can be performed by other devices, such as an external hardware interrupt request (IRQ), which forces the DSP (controller 24) to stop the execution and support of other functions and immediately service the fault related tasks.

The control system 20 provides a "reversionary" mode where the status of both light filaments 60 and 62 is continuously monitored and the current path is switched to go through the "healthy filament" and bypass the failed or open filament. The circuit 28 includes an A/D converter 86 that samples the voltage between the two lights 60, 62. The A/D converter 86 converts the voltage signal to digital form and sends it to the controller 24 for analysis. If the controller 24 determines that the sample voltage falls below a predefined set value stored in the memory 34, an open circuit condition is identified thereby producing an indication that light 60 is in an open state. If this situation occurs, the controller 24 disables the PWM1 signal and enables the PWM2 and PWM3 signals, thereby opening the switch 54 and closing the switch 56.

As an alternative "reversionary" and detection method during normal operation with the switches 54 and 66 are enabled to monitor the current from the sensor 78 and continuously provide its value to the controller 24 via the amp filter 82. The controller 24 can change the operation of the switches 54, 56, 66, and 68 based on the information received from the current sensor 78. For example, if the current sensor 78 shows that the current has dropped below a predefined set value, the controller 24 disables the switches 56 and 66, and enables the switches 54 and 68, then checks the current sensed at the current sensor 80 as sent through the amp filter 84. If the current received from the current sensor 80 is below an acceptable value, then the light 60 is in an open state and the light 62 is still acceptable for use. In this case, the switches 54 and 68 will be disabled and the switches 56 and 66 will be enabled. However, if the current sensed at the current sensor 80 is also below the predefined value, then both of the lights 60, 62 must be replaced.

The controller 24 also monitors voltage and current values from the main bus power supply 50. If the controller 24 determines that the voltage of the main bus power supply 50 exceeds an upper threshold voltage, a fault is logged into the memory 34 and may shut down the lights 60, 62. If the controller 24 senses that the voltage has fallen back below the upper threshold voltage then the controller 24 reactivates the lights 60, 62.

The controller 24 also monitors average voltage produced by the main bus power supply 50. The controller 24 may record average voltage at various sample rates into the memory 34 and/or may only record when the average voltage exceeds a predefined threshold value. The recorded average voltage information is used later by a health monitor component/diagnostic system to determine the life of the circuit components, specifically the halogen or incandescent lights 60, 62 and any LEDs. If this condition is detected as a result of the main power interruption or simply by shutting off the main power to the light system, the controller 24 will disable the power stage components (54, 56, 66, 68, 70, 72, 74, 92, 96, 100, 102, 114, 118, 120, and 122), shut off the lights 60, 62 and save the latest system variables into the memory 34 until the monitored bus voltage returns to an acceptable voltage. The last stored variables (parameters or states like faults, temperature, average voltage, . . . etc.) will be the default starting values after power interruption recovery.

The controller 24 also receives a current signal from the main bus power supply 50 for monitoring if the main bus produces an excessive current spike for a value greater than a predefined threshold stored in memory 34. If a current spike greater than the threshold is detected, the controller 24 disables power, shuts off the lights 60, 62 and saves the latest system variables into the memory 34 until the monitored bus current returns to a value below the threshold.

Figure 3:
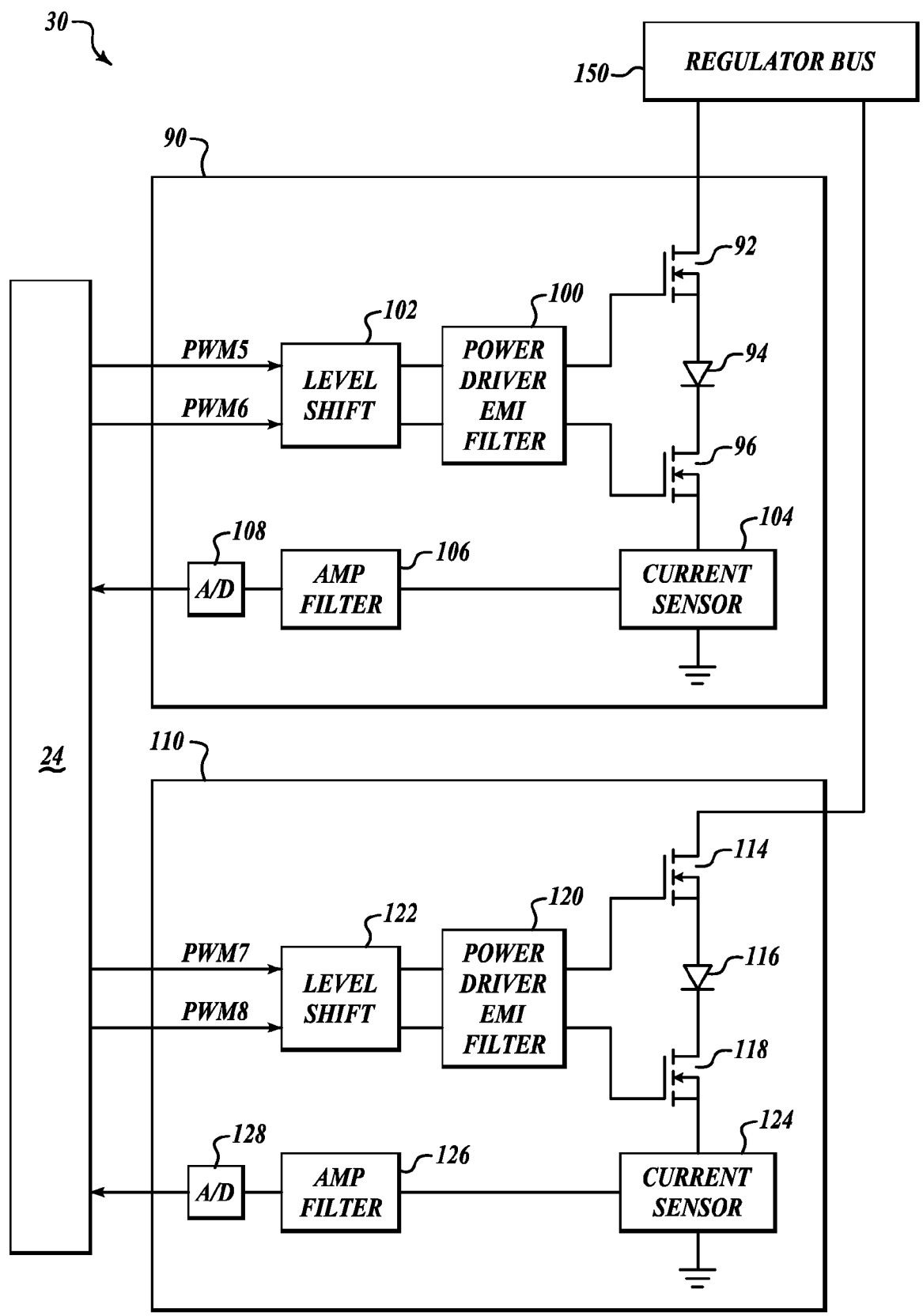

FIG. 3 illustrates a more detailed example of the IR light circuit 30 from FIG. 1. In one embodiment, the IR light circuit 30 includes a primary LED circuit 90 and a secondary LED circuit 110. Each of the circuits 90, 110 are similar. The circuits 90, 110 include a first switch 92, 114 (N-channel MOSFET), that receives a supply voltage from a voltage regulator bus 150 that converts the main DC supply voltage into an appropriate level to operate the LEDs. It also includes a circuit to limit and regulate the current output. A gate of the switches 92, 114 is connected to respective power driver EMI filters 100, 120. The source of the switches 92, 114 is connected to an input of an LED 94, 116. The outputs of the LEDs 94, 116 are connected to a drain of a switch 96, 118 (N-channel MOSFET). The gates of the switches 96, 118 are controlled by the respective power driver EMI filter 100, 120. The sources of the switches 96, 118 are connected to a current sensor 104, 124. The circuits 90, 110 also include level shifts 102, 122 that boosts the voltage of the received PWM5-8 signals. PWM5-8 signals control operation of the switches 92, 96, 114, 118. During normal operation, the PWM5, 6 signals sent to the level shift 102 activate the switches 92 and 96, thereby causing the LED 94 to illuminate. The PWM7, 8 signals deactivate the switches 114, 118.

The controller 24 minimizes EMI emissions by providing a gradual increase in the duty cycle of PWM5, 6 and PWM7, 8 signals. The implementation of the phase shift between the signals is performed using hardware and/or software. The controller 24 may include an additional external shift register or delay circuit in order to accomplish the phase shift.

Amplification filters 106, 126 are connected to the current sensors 104, 124 for amplifying a current value that is generated by the current sensors 104, 124. A/D converters 108, 128 convert the output of the amplification filters 106, 126 into digital signals for use by the controller 24. The controller 24 determines if an open or short circuit is present based on the signals sent from the current sensors 104, 124 via the amplification filters 106, 126 and the A/D converters 108, 128. The controller 24 activates the secondary circuit 110 if the controller 24 determines that a short circuit condition exists in the primary circuit 90. The controller 24 also senses if the LED circuits 90, 110 are operating above or below normal operating levels based on the sensed current received from the A/D converters 108, 128. During a running condition, and after a specified start-up delay, the controller 24 monitors the average sensed current to determine whether the LED 94 or 116 is above or below normal operating level. If the current exceeds the normal level, the controller 24 deactivates the LEDs 94, 116 for a specified wait period followed by an attempt to restart provided the user interface controls 32 has IR illumination selected. The controller 24 records a fault into the memory 34. If the controller 24 still identifies an unacceptable sensed current after the respective circuit 90, 110 is restarted, the LEDs 94, 116 are deactivated.

PWM channels 5-8 signals also control the voltage modulation and thus power across the LEDs 94, 116. The controller 24 provides dimming of the LEDs 94, 116 from light intensities ranging from 0-100% by changing the duty cycle of the respective PWM5-8 signals.

In one embodiment, the system 20 is configured to have default initial factory dimming levels for the visible light circuit 28 and the IR light circuit 30. The factory dimming levels may be stored in the memory 34. If the dimming levels are changed either by an operator or automatically by the controller 24, the controller 24 stores the new dimming level in the memory 34 and uses that as the default illumination condition for the next activation of the respective circuit.

The PWM1-8 signals are at least partially independent of each other and include adjustable frequencies and phases that are controlled by the controller 24. This allows the controller 24 to control noise as well as reduce EMI.

The user interface controls 32 include any of a number of or combination of different types of light and dimming controllers. For example, the user interface controls 32 include pushbutton dimming controls or analog dimming control inputs (0.2-4.8 VDC). Also, the user interface controls 32 include a master lamp ON/OFF momentary switch that activates all lamp control operations. The activation logic for the master lamp switch is either performed on edge or level logic. A level logic is a constant voltage level applied (for example 28 VDC or 5 VDC can be defined as logic high and zero as logic low). If rising or falling edge logic is used, the edge of switch activation is detected once (logic low-to-high or high-to-low). When a second edge is detected all light controls are disabled. The enabling and disabling function continues at every other edge. If a level logic is selected, a logic high enables the light functions.

The controls 32 also include two independent up/down (brighter and dimmer) momentary switches for controlling dimming of the visible light circuit 28 or the IR circuit 30. When one of the dimming control switches is activated and held, the controller 24 increases or decreases the illumination of the lights 60, 62 or LEDs 94, 116 linearly from 0-100% within a period controlled by a variable stored in the memory 34. This variable controls the brightness level as a function of time.

The controller 24 includes a means for adjusting dimming characteristic curves for the visible light circuit 28 and the IR circuit 30. In one embodiment, initial implementation may be non-linear. Once the proper characterization curve has been determined, scaling factors based on a correlation table/curve or function are applied to linearly dim the lights 60, 62 or LEDs 94, 116. Light photometrics testing is initially conducted in the lab (prior to production) to establish the proper correlation between light output and the PWM duty cycles when dimming is activated.

Whenever the main power bus (e.g., 28 VDC bus) is recycled (turned OFF and ON), the controller 24 assumes that the lights 60, 62 and LEDs 94, 116 are operating properly and operates according to that assumption.

The controller 24 performs a soft start function. When either of the circuits 28, 30 are activated, the controller 24 ramps up the modulated duty cycle to a target duty cycle at a predefined rate (stored in memory 34).

The controller 24 continuously performs health monitoring analysis. Test mode (for maintenance and diagnostics), fault isolation and life/elapsed run times for the lights 60, 62 and LEDs 94, 116 are captured and stored in the memory 34 for later diagnostic analysis and system life tracking. The controller 24 detects all faults and stores them in the memory 34, even if the fault condition disappears. Resetting and clearing of selected fault codes may be manually or automatically performed. The following is an example of recorded faults from lowest to highest:
  1. No fault conditions;
  2. Lamp invalid switch command;
  3. Lamp bus under-voltage or power off;
  4. Lamp power stage over temperature;
  5. Lamp bus over-voltage;
  6. Secondary LED open circuit;
  7. Secondary LED short circuit;
  8. Primary LED open circuit;
  9. Primary LED short circuit;
  10. Halogen or incandescent light open circuit; and
  11. Halogen or incandescent short circuit.

The controller 24 can also determine if faulty command control inputs are applied. In such a case, the controller 24 records faulty control inputs in the memory 34.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A dual mode lighting system comprising:
   a controller;
   a visible light circuit in signal communication with the controller, the visible light circuit comprises:
      a first light and a second light, the first light and the second light are at least one of halogen or incandescent lights;
      a first switch connected between a power source and a first light;
      a second switch connected between the power source and a connection between the first and second lights;
      a third switch connected between the first and second light and ground; and
      a fourth switch connected between the second light and ground;
   an infrared (IR) light circuit in signal communication with the controller; and
   a user interface in signal communication with the controller,
   wherein the controller controls operation of the switches using a plurality of control signals,
   wherein the controller controls operation of the circuits based on signals received from the user interface.

2. The system of claim 1, further comprising:
   a canopy system configured to generate a signal based on the sensed position of the canopy,
   wherein the controller further controls operation of the circuits based on the generated signal.

3. The system of claim 1, further comprising:
   one or more temperature sensors configured to sense temperature proximate to at least one of the lights or the LEDs and send the sensed temperature to the controller, wherein the controller further controls operation of the circuits based on the sensed temperature.

4. The system of claim 1, wherein the switches are field effect transistors.

5. The system of claim 4, further comprising current sensors for sensing current passing though the lights.

6. The system of claim 5, further comprising a voltage sensor for sensing a voltage supplied by the power source.

7. The system of claim 6, wherein the control signals are pulse-width modulation (PWM) signals.

8. The system of claim 7, wherein the controller dims the lights by controlling duty cycle of the PWM signals based on dimming control signals received from the user interface, the voltage sensor and the current sensor.

9. The system of claim 7, wherein the IR circuit comprises a primary LED circuit and a secondary LED circuit, each of the primary and secondary LED circuits comprising:
   a first transistor switch connected to the power source;
   an LED with an input connected to the respective first switch; and
   a second transistor switch connected between an output of the respective LED and electrical ground.

10. The system of claim 9, wherein the controller supplies PWM signals to the switches of the primary and secondary LED circuits based on information received from the user interface.

11. The system of claim 10, wherein the controller dims either of the LEDs by controlling duty cycle of the PWM signals sent to the switches of the primary and secondary LED circuits based on dimming control signals received from the user interface.

12. The system of claim 11, wherein the user interface includes a single device for generating the dimming control signals.

13. The system of claim 10, wherein each of the primary and secondary LED circuits comprise a current sensor for detecting current passing through the LED, wherein the controller further controls operation of the primary and secondary circuits based on the sensed currents.

* * * * *